United States Patent Office 3,524,846
Patented Aug. 18, 1970

3,524,846
PROCESS FOR THE DIDEALKYLATION OF PHOSPHONATE ESTERS
John G. Moffatt, Los Altos, and Gordon H. Jones, Palo Alto, Calif.; said Moffatt assignor to Syntex Corporation, Panama, Panama, a corporation of Panama
No Drawing. Filed June 2, 1967, Ser. No. 643,078
Int. Cl. C07f 9/40
U.S. Cl. 260—211.5                                22 Claims

ABSTRACT OF THE DISCLOSURE

Didealkylation of phosphonate esters is effected by heating them with a soluble bromide or iodide salt in an aprotic dipolar solvent at a temperature in excess of 100° C.

---

This invention relates to a novel process for the didealkylation of phosphonate ester compounds. More particularly, this invention relates to a process for the didealkylation of a dialkyl phosphonate ester by heating said dialkyl phosphonate ester with a soluble bromide or soluble iodide salt in an aprotic dipolar solvent at a temperature in excess of 100° C. Due to the essentially neutral conditions of the process of the present invention, it is particularly useful for the didealkylation of lipids, steroids, sugars and nucleosides having a dialkoxyphosphinyl groups.

Any dialkyl phosphonate ester of the general Formula I can be didealkylated by the process of the present invention as shown in the following sequence:

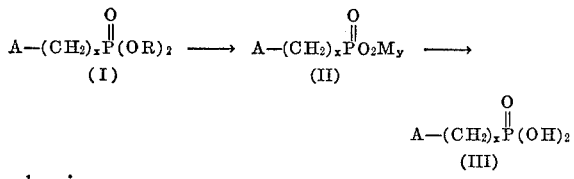

wherein:

A is an aliphatic, alicyclic, aromatic or heterocyclic group;

R is lower alky;

M is a monovalent cation or a divalent cation;

$x$ has a value of 0 or 1; and $y$ has a value of 1 or 2, said value being 1 when M is a divalent cation and 2 when M is a monovalent cation.

Heretofore, two alkyl groups could be removed from a dialkyl phosphonate ester only under vigorous conditions, e.g. by refluxing under acidic conditions. Such a process was limited to those dialkyl phosphonate esters which were stable under the strongly acidic conditions of the method. In addition, it was also possible to effect the removal of a single alkyl group. For example, monodealkylation of the dialkyl esters of steroidal 21a-phosphonic acids was effected by treating them with alcoholic sodium propylmercaptide or alcoholic sodium ethylmercaptide, as described by S. Hirai et al., Tetrahedron, vol. 22, 1625–1640 (1966).

A primary object of the present invention is to provide a process for the didealkylation of dialkyl phosphonate esters wherein the removal of two alkyl groups is accomplished in one step under essentially neutral conditions whereby the disadvantages set out above are overcome. Another object of the present invention is to provide a process for the didealkylation of phosphonate esters wherein valuable phosphonic acid salts are obtained which are useful per se or which can be converted into the free phosphonic acid. Another object of the present invention is to provide a process for the didealkylation of phosphonate esters under essentially neutral conditions which is especially useful for sensitive molecules such as lipids, steroids, sugars, and nucleosides. Other objects and advantages of the present invention will become apparent as the invention is described hereinafter in detail and from the appended claims.

The term "lower alkyl," as used herein, refers to a straight or branched chain hydrocarbon group containing up to six carbon atoms inclusive and thus includes methyl, ethyl, isopropyl, n-butyl, and the like. The term "alkoxy," as used herein, means the group —OR wherein R is lower alkyl as defined hereinabove. The term "dialkoxyphosphinyl" means the

group wherein R is lower alkyl as defined hereinabove. Included in the term "monovalent cation" are lithium, sodium, potassium, ammonium, tetramethylammonium, tetraethylammonium, tetra-n-propylammonium, tetra-n-butylammonium, and the like. Included in the term "divalent cation" are calcium, barium, and the like. The term "homo," as used herein, means a methylene group between the A group and the dialkoxyphosphinyl group in the general formula

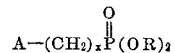

i.e. wherein $x=1$, thus representing phosphonate esters that are isosteric with the corresponding phosphate esters

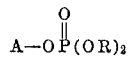

Included among the aliphatic, alicyclic and aromatic groups which A represents are alkyl (including saturated and unsaturated, straight or branched chain alkyl and cycloalkyl) and aryl (including alkaryl and aralkyl) groups, such as methyl, ethyl, propyl, isopropyl, n-butyl, sec-butyl, amyl, hexyl, heptyl, octyl, allyl, methallyl, cyclobutyl, cyclopentyl, cyclohexyl, methylcyclohexyl, cycloheptyl, cylohexenyl, phenyl, tolyl, xylyl, benzyl, and the like, as well as fused ring structures, such as indanyl, indenyl, naphthyl, acenapthyl, phenanthryl, and cyclopentanopolyhydrophenanthryl rings, and the like, all of which can either be unsubstituted or substituted with one or more noninterfering substituents, e.g. hydroxy, groups; hydroxy derivatives, such as alkoxy, e.g. methoxy and acyloxy, e.g. acetoxy groups; nitro groups; amino groups; alkylamino groups, such as methylamino, dimethylamino and diethylamino groups; halogens, e.g. fluorine or chlorine; carbonyl derivatives, such as enol ether; acetal and ketal groups, and the like.

An illustrative but by no means exhaustive listing of dialkyl aliphatic, alicyclic and aromatic phosphonate esters includes:

diethyl ethylphosphonate;
dibutyl nonylphosphonate;
dibutyl ethylphosphonate;
diethyl methylphosphonate;
diethyl 2-octylphosphonate;
dibutyl phenylphosphonate;
dibutyl n-amylphosphonate;
diethyl trichloromethylphosphonate; and
dibutyl amylnaphthylphosphonate,
and the like.

The above aliphatic, alicyclic and aromatic phosphonates are converted, by the process of the invention, to the corresponding intermediary aliphatic, alicyclic and aromatic phosphonic acid salt (II) and aliphatic, alicyclic and aromatic phosphonic acid (III), respectively.

Furthermore, where A in the general formula

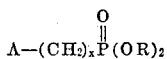

given above for a dialkyl phosphonate ester represents a particular class of substituted aliphatic groups, i.e. a glyceride of saturated and/or unsaturated higher fatty acids or glyceryl ethers of saturated and/or unsaturated higher aliphatic alcohols, i.e. those having the structure:

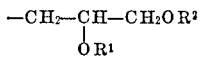

herein each of $R^1$ and $R^2$ is a saturated hydrocarbon carboxylic acyl group having a straight-chain and an even number of carbon atoms from a value of 8 to a value of 26 inclusive, e.g. caprylyl, capryl, lauryl, myristyl, palmityl, stearyl, arachidyl, behenyl, lignoceryl, cerotyl, and the like; an unsaturated hydrocarbon carboxylic acyl group having 18 carbon atoms and unsaturation at the C–9, C–9 and C–12, or C–9, C–12, and C–15 positions, e.g. at oleyl, linoleyl, linolenyl, and the like; or a higher aliphatic group, e.g. hexadecyl, octadecyl, and the like, the starting material is a dialkyl lipid phosphonate or a dialkyl homolipid phosphonate, i.e.

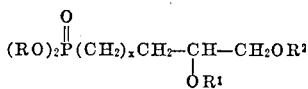

and will be converted, by the process of the invention, to the corresponding intermediary lipid phosphonic acid salt (II) or homolipid phosphonic acid salt (II) and lipid phosphonic acid (III) or homolipid phosphonic acid (III), respectively, i.e.:

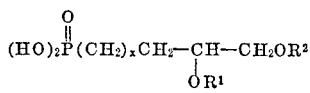

all substituents being as defined hereinabove. Illustrative of the lipid phosphate esters represented by this general formula, are:

diethyl 2-hexadecyloxy-3-octadecyloxypropylphosphonate;
diethyl 3,4-dioctadecyloxybutyl-1-phosphonate,
and the like.

Furthermore, where A in the general formula

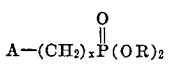

given above for a dialkyl phosphonate ester represents a particular class of substituted cyclopentanopolyhydrophenanthryl groups, i.e. a steriod of the androstane, pregnane or cholestane series; the dialkoxyphosphinyl group can be attached to a carbon atom at various positions of the steroid or to a methylene group which in turn is attached to the carbon atom at various positions of the steriod.

An illustrative but by no means exhaustive listing of steroidal dialkyl phosphonate esters represented by the general Formula I are:

16-diethoxyphosphinylpregnenolone;
16-diisopentoxyphosphinylpregnenolone;
16-diethoxyphosphinylprogesterone;
7-diethoxyphosphinyltestosterone;
17β-acetoxy-1-diethoxyphosphinyltestosterone;
21-acetoxy-1-diethoxyphosphinylcortisone;
21-acetoxy-1-diethoxyphosphinylhydrocortisone;
3β-acetoxy-21-diethoxyphosphinylmethylpregn-5-en-20-one;
3β-acetoxy-21-diethoxyphosphinylmethyl-17α-hydroxypregn-5-en-20-one;
3β-acetoxy-17α-hydroxy-21-diisopropoxyphosphinylmethylpregn-5-en-20-one;
3β,17α-diacetoxy-21-diethoxyphosphinylmethylpregn-5-en-20-one;
3β,17α-diacetoxy-21-diisopropoxyphosphinylmethylmethylpregn-5-en-20-one;
21-diethoxyphosphinylmethyl-3β-hydroxypregn-5-en-20-one;
21-diethoxyphosphinylmethyl-3β,17α-dihydroxypregn-5-en-20-one;
3β,17α-dihydroxy-21-diisopropoxyphosphinylmethylpregn-5-en-20-one;
17α-acetoxy-21-diethoxyphosphinylmethyl-3β-hydroxypregn-5-en-20-one;
17α-acetoxy-21-diisopropoxyphosphinylmethyl-3β-hydroxypregn-5-en-20-one;
21-diethoxyphosphinylmethylprogresterone;
21-diethoxyphosphinylprogresterone;
21-diethoxyphosphinylmethyl-17α-hydroxyprogresterone;
17α-hydroxy-21-diisopropoxyphosphinylmethylprogesterone;
17α-acetoxy-21-diethoxyphosphinylmethylprogresterone;
17α-acetoxy-21-diisopropoxyphosphinylmethylprogesterone;
3β-dimethoxyphosphinylcholestan-3α-ol;
3-dimethoxyphosphinylcholest-2-ene;
3β-dimethoxyphosphinylcholest-3-ene;
3β-dimethoxyphosphinylcholestane;
3α-dimethoxyphosphinylcholestane;
3α-hydroxy-3β-dimethoxyphosphinyl-5α-androstan-17-one; and
3β-hydroxy- 3α-dimethoxyphosphinyl-5β-pregnan-11,20-dione, and the like.

The above steroidal starting materials are converted, by the process of the present invention, to the corresponding intermediary steriod phosphonic acid salt (II) and steriod phosphonic acid (III), respectively.

Included among the heterocyclic groups which can be represented by A are substituted or unsubstituted furfuryl groups, tetrahydrofurfuryl groups, furanosyl groups, pyranosyl groups, piperidyl groups, pyrrolidyl groups, pyridyl groups, thiophene groups, and alkaloid nuclei groupings, containing, for example, indole, dihydroindole, quinuclidene, and quinoline groups, and the like. Furthermore, where A in the general formula

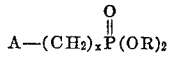

given above for the dialkyl phosphonate ester represents a particular class of substituted or unsubstituted furanosyl groups, i.e. those having the particular stereochemical configurations represented by the structure:

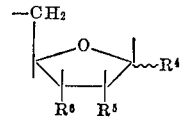

wherein $R^4$ is alkoxy, aralkoxy, or acyloxy; $R^5$ is hydrogen, hydroxy or acyloxy; $R^6$ is hydroxy or acyloxy; and $R^5$ and $R^6$ are an acetal or ketal group, e.g. isopropylidenedioxy and the like, the phosphonate ester (I) is a dialkyl 5-deoxyribose 5-phosphonate or a dialkyl 5,6-dideoxyhomoribose 6 - phosphonate, (dialkyl 5,6 - dideoxyallofuranose 6-phosphonate, i.e.

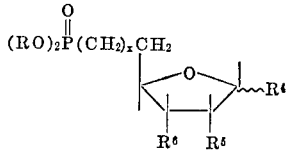

and will be converted, by the process of the invention, to the corresponding intermediary 5-deoxyribose phosphonic acid salt (II) or 5′,6-dideoxyhomophosphonic acid salt (II) and 5-deoxyribose 5-phosphonic acid (III) or 5,6-dideoxyhomoribose 6-phosphonic acid (III), derivative, (5,6-dideoxyallofuranose 6-phosphonic acid), i.e.:

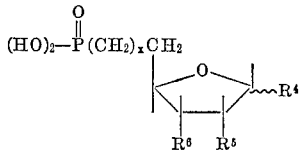

all substituents being as defined hereinabove. Furthermore, where A in the general formula

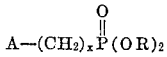

given above for a dialkyl phosphonate ester represents a particular class of substitute or unsubstitued pyranosyl groups, i.e. those having the particular stereochemical configuration represented by the structure:

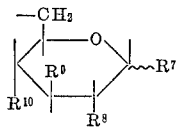

wrein $R^1$ represents hydroxy, alkoxy, acyloxy; and each of $R^8$, $R^9$ and $R^{10}$ is hydroxy or acyloxy, the phosphonate ester (I) is a dialkyl 6-deoxyglucose 6-phosphonate or a dialkyl 6,7-dideoxyhomoglucose 7-phosphonate, (dialkyl 6-deoxy-gluco-heptopyranosyl 7-phosphonate) i.e.:

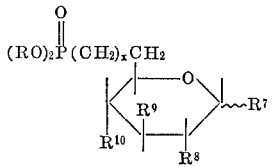

and will be converted by the process of the present invention, to the corresponding intermediary phosphonic acid salt (II) or homophosphonic acid salt (II) and 6-deoxyglucose 6-phosphonic acid (III) or 6,7-dideoxyhomoglucose 7-phosphonic acid (III), (6-deoxy-gluco-heptopyranose 7-phosphonic acid), i.e.:

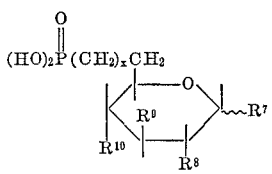

all substituents being as defined hereinabove.

Illustrative of the dialkyl ribose phosphonates and dialkyl glucose phosphonates represented by these general formulas, are:

1,2,3,4-tetra-O-acetyl-6-deoxy-β-D-glucopyranose-6-(diethyl phosphonate);
benzyl 2,3,4-tri-O-acetyl-6-deoxy-β-D-glucopyranoside-6-(diethyl phosphonate);
methyl 6-deoxy-D-glucopyranoside-6-(diethyl phosphonate);
methyl 5-deoxy-2,3-isopropylideneribofuranoside 5-(diethyl phosphonate);
1,2,3-tri-O-acetyl-5-deoxy-D-ribofuranose-5-(diethyl phosphonate);
methyl 5-deoxyribofuranoside 5-(diethyl phosphonate);
methyl 5,6-dideoxy-2′,3′-isopropylidene-β-D-allofuranoside-6-(diethyl phosphonate), and the like. Also included among the dialkyl sugar phosphonates which are converted to sugar phosphonic acids by the process of the present invention, are those having stereochemical configurations other than ribose or glucose, such as, e.g. 6,7-dideoxy - 1,2,3,4 - di-O-isopropylidene-D-galacto-heptopyranose 7-(diethyl phosphonate).

Furthermore, where A in the general formula

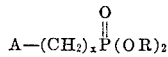

given above for the phosphonate ester, represents a particular class of hydroxy-substituted tetrahydrofurfuryl groups, i.e. those having the structure:

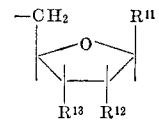

wherein $R^{11}$ is a substituted or unsubstituted pyrimidine or purine base, e.g. uracil-1-yl, cytosin-1-yl, 4-chloro-1,2-dihydropyrimidin-2-on-1-yl, 5-bromouracil-1-yl, 5-bromocytosin-1-yl, 5-chlorouracil-1-yl, 5-chlorocytosin-1-yl, 5-iodouracil-1-yl, 5-iodocytosin-1-yl, 5-fluoroouracil-1-yl, 5-fluorocytosin-1-yl, thymin-1-yl, 5-methylcytosin-1-yl, 5-trifluoromethyluracil - 1 - yl, 5-trifluoromethylcytosin-1-yl, 5-aminouracil-1-yl, 5-aminocytosin-1-yl, 5-methylaminouracil-1-yl, 5-methylaminocytosin-1-yl, 5-hydroxyuracil-1-yl, 6-azauracil-1-yl, 6-azacytosin-1-yl, 4-chloro-6-aza-1,2-dihydropyrimidin-2-on-1-yl, 6-azathymin-1-yl, hypoxanthin-9-yl, adenin-9-yl, 6-dimethylaminopurin-1-yl, 2-chloroadenin-9-yl, 6-chloropurin-9-yl, 6-mercaptopurin-9-yl, guanin-9-yl, xanthin-9-yl, 2,6-dichloropurin-9-yl, 2,6-bis-(methylamino)purin-9-yl, 8-azaadenin-9-yl, 8-azaguanin-9-yl, 7-deazaadenin-9-yl, and the like; $R^{12}$ is hydrogen, hydroxy, alkoxy or acyloxy; $R^{13}$ is hydrogen, hydroxy, alkoxy or acyloxy; and $R^{12}$ and $R^{13}$ together are an acetal or ketal group, e.g. isopropylidenedioxy and the like, the phosphonate ester (I) is a dialkyl 5′-deoxynucleoside 5′-phosphonate or a dialkyl 6′-deoxynucleoside 6′-phosphonate, i.e.:

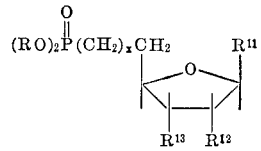

with $x=0$ and 1 respectively, and will be converted, by the process of the present invention, to the corresponding intermediary phosponic acid salt (II) or homophosphonic acid salt (II) and 5′-deoxynucleoside 5′-phosphonic acid (III) or 5′,6′-dideoxyhomonucleoside 6′-phosphonic acid (III), i.e.:

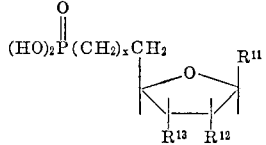

all substituents being as defined hereinabove.

Illustrative of the nucleoside dialkyl phosphate esters represented by this general formula are:

diethyl 5′-deoxy-2′,3′-O-isopropylideneuridine 5′-phosphonate;
di-n-propyl 5′-deoxy-2′,3′ - O - isopropylideneuridine 5′-phosphonate;
di-n-propyl 5′-deoxyuridine 5′-phosphonate;
9 - [5′ - deoxy - 5′ - (diethoxyphosphinyl) - β - D-ribofuranosyl]-6-amino-2-(methylthio)purine;

and the like. Also included among the dialkyl nucleoside phosphonates which can be didealkylated by the process of the present invention, are those containing sugars other than ribose or 2-deoxyribose.

In the practice of the process as outlined in the above sequence, a dialkyl phosphonate ester (I) is heated with at least two molar equivalents of a soluble iodide or bromide salt in an aprotic dipolar solvent at a temperature in excess of 100° C. to yield an intermediary phosphonic acid salt (II). Aprotic dipolar solvents particularly useful for this process are dimethylformamide, dimethylacetamide, dimethyl sulfoxide, N-methylpyrrolidinone, hexamethylphosphoramide, tetramethylurea, and the like, and mixtures thereof. Iodide and bromide salts useful for the above process are potassium iodide, sodium iodide, lithium iodide, calcium iodide, barium iodide, ammonium iodide, tetramethylammonium iodide, tetraethylammonum iodide, tetra n-butylammonium iodide, lithium bromide, ammonium bromide, tetraethylammonium bromide, tetra n-butylammonium bromide, and the like. Preferably, the reaction is performed with sodium iodide in dimethylformamide, dimethylacetamide or mixtures thereof. Although the quantity of the iodide or bromide satl is not critical, at least two molar equivalents of the iodide or bromide salt per mole of the dialkyl phosphonate ester (I) should be used. Preferably, there is used four molar equivalents of the salt per mole of starting material. The amount of solvent is not critical; although an amount of solvent sufficient to effect solution of both the dialkyl phosphonate ester and the iodide or bromide salt should be used.

Although a temperature slightly in excess of 100° C. is sufficient to effect the didealkylation, long periods of time are required. More conveniently, the didealkylation is effected at about 140° C. to 150° C. for a period of time of about 15 to about 36 hours. Higher temperatures can be used in which case the reaction time will be shorter; however, to avoid danger of decomposing the phosphonate ester being didealkylated caution should be exercised in raising the temperature too high. The most advantageous temperature for a particular phosphonate ester can be easily determined by one of ordinary skill in the art by routine experimentation.

In the practice of the above described process, a portion of the intermediary phosphonic salt (II) is converted to the corresponding pyrophosphonic acid salt of the following formula:

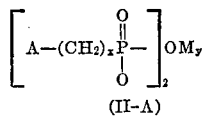

(II-A)

all substituents being as defined hereinabove.

This mixture of the phosphonic acid salt (II) and the pyrophosphonic acid salt (II-A) can be isolated by precipitation by a solvent, e.g. acetone, methylethylketone, ethanol, and the like, in which the bromide or iodide salt is soluble. For example, the mixture of the salts (II) and (II-A), is conveniently isolated by the addition of an excess of acetone in those cases wherein sodium iodide, lithium iodide, calcium iodide or barium iodide is used for the didealkylation.

Separation of the salts (II) and (II-A) can be accomplished at this time by chromatography, if desired, or alternatively, the mixture of salts can be treated with an acid or an acidic material to obtain a corresponding mixture of free phosphonic acid and free pyrophosphonic acid. For example, in the case of lipids, sugars and nucleosides, the mixture of salts can be separated by ion-exchange chromatography, e.g. on a column of anion-exchange resin in the chloride form with a gradient of, e.g. calcium chloride or lithium chloride in 0.003 N hydrochloric acid. In the case of steroids, the mixture of salts can be separated by column chromatography, e.g. on a column of diethylaminoethyl cellulose with a gradient of, e.g. calcium chloride in 0.003 N hydrochloric acid. Alternatively, chromatography on a cellulose column, or, preferably on preparative cellulose, thin layer plates, can also be used to separate the mixture of salts (II) and (II-A).

Acidification of the thus-obtained mixture of salts or the individual constituents thereof, which have been separated by the above chromatographic technique, with an acid or acidic material, affords a corresponding mixture of the phosphonic acid and the pyrophosphonic acid or the individual constituents thereof. Conventional inorganic acids such as hydrochloric acid, sulfuric acid, phosphoric acid, and the like; organic acids such as acetic acid and the like; and acidic materials such as an acid-form ion-exchange resin, e.g. sulfonated polystyrene beads cross-linked with 8% divinylbenzene, are employed for this acidification. Preferably, the acidification is performed with an acid-form ion-exchange resin.

An acidified solution of the pyrophosphonic acid or salt thereof is then heated at an elevated temperature, for example, at about 100° C., for a period of about one-half to about two hours to convert the pyrophosphonic acid or salt thereof to the phosphonic acid (III). The acidified solution is obtained from acidifying a mixture of the salts (II) and (II-A), a mixture of the phosphonic acid and pyrophosphonic acid, or the isolated pyrophosponic acid salt (II-A) or pyrophosphonic acid. Higher or lower temperatures can be used for shorter or longer periods of time depending on the nature of the phosphonic acid (III).

The nucleoside phosphonic acids and salts thereof, are anti-metabolic and anti-bacterial agents and are useful against a variety of organisms. The phosphonic acids or salts thereof, prepared herein, are not sensitive to cell wall phosphatase and hence are not cleaved into the parent nucleoside during entrance into the cell. They are, for example, the uridine derivatives, promoters of cell lysis. In addition, the nucleoside phosphonic acids and salts thereof, prepared herein, are useful intermediates for making phosphonate analogs of nucleotide co-enzymes. Ethanol amines or choline esters of lipid phosphonic acids, prepared herein, are isomers of naturally occurring lipid phosphonates and are useful in the study of and understanding of the natural products, De Koning, Nature 210, p. 113 (1966). Phosphonic acid sugars and salts thereof, particularly the homosugars, are analogs of known sugar phosphates which are key metabolic intermediates. These compounds are useful in regulating and controlling metabolism. The steroid phosphonic acids and salts thereof, prepared herein, are physiological agents which can be used and administered in the same manner as the parent steroid. They are particularly effective in those cases where a stable water soluble preparation is desired.

The following examples are set forth to illustrate the present invention.

EXAMPLE 1

A mixture of 3.5 g. of diethyl 2-hexadecyloxy-3-octadecyloxypropylphosphonate and 3 g. of sodium iodide in 20 ml. of dimethylformamide is heated at 150° C. for 20 hours. Following this reaction period, the mixture is evaporated to dryness in vacuo and the residue is triturated with 50 ml. of acetone to yield a precipitate which is then washed with fresh acetone. The resulting precipitate is then dissolved in 20 ml. of 50% aqueous methanol and passed through a column of acid-form ion-exchange resin of sulfonated polystyrene beads cross-linked with 8% divinylbenzene. The acidic eluate is then heated at 100° C. for one hour and then evaporated to dryness to yield 2-hexadecyloxy-3-octadecyloxypropyl-1-phosphonic acid.

In a similar manner by repeating the above procedure with one exception, namely substituting diethyl 3,4-dioctadecyloxy butylphosphonate for the above starting material, there is obtained the corresponding 3,4-dioctadecyloxybutyl-1-phosphonic acid.

EXAMPLE 2

A mixture of 2.3 g. of 21-diethoxyphosphinylmethyl-3β-hydroxypregn-5-en-20-one and 3 g. of sodium iodide in 20 ml. of dimethylformamide is heated at 150° C. for 24 hours. Following this reaction period, the mixture is evaporated to dryness and the residue is triturated with 50 ml. of acetone to yield a precipitate. The precipitate is dissolved in 10 ml. of 50% aqueous ethanol and the solution is then passed through a column of acid-form ion-exchange resin of sulfonated polystyrene beads cross-linked with 8% divinylbenzene. The acidic eluate is heated at 100° C. for one hour, evaporated to dryness to yield 21a-methylphosphonic acid of 3β-hydroxypregn-5-en-20-one.

To a solution of 1 g. of the latter compounds in 50 ml. of aqueous ethanol is added aqueous sodium hydroxide solution until the pH of the reaction solution is 8.0. At this point, the solution is evaporated to dryness to yield the disodium salt of 3β-hydroxypregn-4-en-20-one - 21a-methyl.

In a similar manner by repeating the above procedure with one exception, namely substituting first 21-diethoxyphosphinylmethylprogesterone for the above starting material, and second 21 - diethoxyphosphinylprogesterone, there are obtained the corresponding 21-phosphonic acid, respectively.

EXAMPLE 3

To a solution of 4.36 g. of methyl 5-deoxy-2,3-O-isopropylidene-β-D - allofuranoside in 50 ml. of dimethylformamide there is added 18 g. of methyltriphenoxyphosphonium iodide, and the resulting mixture is allowed to stand at room temperature for one hour. Following this reaction period, the solvent is evaporated under reduced pressure and the resulting residue is partitioned between chloroform and water. The chloroform layer is washed with aqueous 5% sodium thiosulfate solution, 2 N sodium hydroxide solution and water, dried and evaporated to a syrup. Distillation of the syrup in a short-part apparatus at 0.1 mm. of mercury and a bath temperature of 100° C. gave methyl 5,6-dideoxy-6-iodo-2,3-O-isopropylidene-β-D-allofuranoside as a colorless oil.

A solution of 3.28 g. of the latter compound and 20 ml. of triethyl phosphite is heated at 150° C. for 16 hours while a stream of nitrogen saturated with triethyl phosphite is passed through the solution. The reaction mixture is evaporated to dryness under reduced pressure at 50° C. to afford a residue. The residue crystallized spontaneously to yield methyl 5,6-dideoxy-2,3-isopropylidene-β-D-allofuranoside 6-(diethyl phosphonate).

A mixture of 1.69 g. of the latter compound and 3.0 g. of sodium iodide in 10 ml. of dimethylformamide is heated at 150° C. for 24 hours. The resulting light brown solution is then added to 50 ml. of acetone and the resulting precipitate is collected by filtration and washed with several portions of acetone. The precipitate is then dissolved in 25 ml. of 10% acetic acid and the resulting solution is heated at 100° C. for one hour. Following this reaction period, the reaction mixture is evaporated to dryness to yield a residue which is chromatographed on three 1 meter x 20 cm. glass plates coated with 1.3 mm. layer of microcrystalline cellulose. The plates are developed in n-propanol:ammonium hydroxide:water (6:3:1) and the major product is eluted from the plates with water to yield methyl 5,6-dideoxy-β-D-allofuranoside-6-phosphonic acid. A minor product is eluted from the plates with water to yield symmetrical 6,6'-bis(methyl-6-deoxyhomoriboside) pyrophosphonate. To 10 ml. of the first eluate is added 3 ml. of 2 M barium acetate and then 20 ml. of ethanol to yield a precipitate of the barium salt of methyl 5,6-dideoxy-β-D-allofuranoside-6-phosphonic acid. The barium salt is collected by filtration, washed several times with ethanol and dried in vacuo.

EXAMPLE 4

To a solution of 5.76 g. of tetraethyl methylene-bis-phosphonate in 50 ml. of 1,2-dimethoxyethane is added 0.48 g. of sodium hydride and the resulting mixture is held at room temperature for one hour. To the reaction mixture is then added a solution of 5.16 g. of 1,2;3,4-di-O-isopropylidene-α - D - galacto-hexodialdo-1,5-pyranose in 10 ml. of 1,2-dimethoxyethane. The resulting mixture is allowed to stand at room temperature for an additional one hour and then poured into 200 ml. of water, and the aqueous material is extracted with several portions of ethyl acetate. The combined extracts are dried and evaporated to dryness to yield a residue. The residue is chromatographed on a column of silicic acid using a gradient of ethyl acetate in chloroform to yield 6,7-didethydro-6,7-dideoxy-1,2;3,4-O-isopropylidene-α-D-galacto-heptopyranose - 7-(diethyl phosphonate).

A solution of 1 g. of the latter compound in 50 ml. of ethanol is hydrogenated in the presence of 0.4 g. of a prehydrogenated 5% palladium-barium sulfate catalyst under a slight positive pressure of hydrogen at 25% C. for two hours. The catalyst is removed by filtration through diatomaceous earth and washed with several portions of ethanol. The combined filtrate and washings are evaporated under reduced pressure to yield 6,7-dideoxy-1,2;3,4-di-O-isopropylidene - α - D-galacto-heptopyranose 7-(diethyl phosphonate).

A mixture of 1.5 g. of the latter material and 3.0 g. of sodium iodide in 10 ml. of dimethylacetamide is heated at 140° C. for 36 hours. The resulting solution is then added to 50 ml. of acetone and the resulting precipitate is collected by filtration and washed with several portions of acetone. The precipitate is then dissolved in 25 ml. of 10% acetic acid and the resulting solution is heated at 100° C. for one hour. Following this reaction period, the reaction mixture is evaporated to dryness to yield a residue which is chromatographed on three 1 meter x 20 cm. glass plates coated with a 1.3 mm. layer of microcrystalline cellulose. The plates are developed in n-propanol:ammonium hydroxide:water (6:3:1) and the major product is eluted with water to yield 6,7-dideoxy-α-D - galacto-heptopyranose 7-phosphonic acid. To 10 ml. of the eluate is added 3 ml. of 2 M barium acetate and the 30 ml. of ethanol to yield a precipitate of the barium salt of 6,7-dideoxy-α-D-galacto-heptopyranose 7-phosphonic acid. The barium salt is collected by filtration, washed several times with ethanol and dried in vacuo.

EXAMPLE 5

A mixture of 3.68 g. of diethyl 5'-deoxy-2',3'-O-isopropylideneuridine 5'-phosphonate and 5.46 g. of sodium iodide in 25 ml. of dimethylformamide is heated at 150° C. for 20 hours. Paper electrophoresis at pH 7.5 then showed the products to be a roughly equal mixture of two products, one the phosphonic acid dianion and the other the symmetrical dinucleoside pyrophosphonate. The mixture is then concentrated to a volume of 10 ml. and added to 100 ml. of acetone. The resulting precipitate, containing the disodium salts of 5'-deoxyuridine 5'-phosphonic acid $p^1,p^2$-bis[5'-deoxyuridine 5'] pyrophosphonic acid is collected and washed with several portions of acetone. The precipitate is then dissolved in water and passed through a column containing 50 ml. of free acid-form resin of sulfonated polystyrene beads cross-linked with 8% divinylbenzene to give a mixture of the corresponding free acids. The thus-obtained acidic eluate containing a mixture of the free acids is concentrated in vacuo to 50 ml. and heated at 100° C. for one hour to give 5'-deoxyuridine 5'-phosphonic acid. For purification, if desired, the pH of the eluate is then adjusted to 8.5 with aqueous sodium hydroxide solution and the resulting mixture is chromatographed on a 3 x 20 cm. column of anion-exchange resin in the bicarbonate form using 0.5 N triethylammonium bicarbonate solution as eluant. The fraction exhibiting the main ultraviolet absorbing peak is evaporated to dryness. Residual triethylammonium bicarbonate is removed by repeated evaporation with methanol leaving the triethylammonium salt of 5'-deoxyuridine 5'-phosphonic acid as a homogeneous white froth.

An aqueous solution of the latter compound is passed through a column of the free acid-form resin of sulphonated polystyrene beads cross-linked with 8% divinylbenzene and the pH of the eluate is adjusted to 8.5 by the dropwise addition of aqueous sodium hydroxide solution. The eluate is then concentrated to a volume of approximately 10 ml., and added to 50 ml. of acetone to yield the disodium salt of 5′-deoxyuridine 5′-phosphonic acid as a white powder.

EXAMPLE 6

A mixture of 3.94 g. of 3′-O-acetyl-5′-deoxy-5′-iodothymidine and 30 ml. of triethyl phosphite is heated at 150° C. for 19 hours while a stream of nitrogen saturated with triethyl phosphite is passed through the mixture. The excess trietyl phosphite is removed by evaporation under reduced pressure and any remaining volatile impurities are removed at 65° C. and 10$^{-3}$ mm. of mercury in a short-path still to yield a viscous residue containing 3′-O-acetyl-5′-deoxythymidine-5′-diethylphosphonate. The residue was shown to be homogeneous by thin layer chromatography using ethyl acetate:methanol (9:1).

A mixture of 4.16 g. of the latter compound and 6 g. of sodium iodide in 25 ml. of dimethylformamide is heated at 150° C., under nitrogen for 22 hours. Paper electrophoresis at pH 7.5 then showed the products to be a mixture of the phosphonic acid dianion, the symmetrical dinucleoside pyrophosphonate, and thymine. The mixture is then concentrated to a volume of about 10 ml. and added to 100 ml. of acetone. The resulting precipitate containing a mixture of the sodium salts of 3′-O-acetyl-5′-deoxythymidine-5′-phosphonic acid and P$^1$,P$^2$-bis[3′-O-acetyl-5′-deoxythymidine-5′]pyrophosphonic acid is collected and washed with several portions of acetone. The precipitate is then dissolved in 20 ml. of concentrated ammonium hydroxide and the resulting mixture is held at room temperature for one hour. Following this reaction period, the solvent is evaporated under reduced pressure and the resulting residue is dissolved in water and passed through a column containing 25 ml. of free acid-form resin of sulfonated polystyrene beads cross-linked with 8% divinylbenzene to give a mixture of the free acids. The thus-obtained acidic eluate is heated at 100° C. for 30 minutes. At this point, a single ultraviolet absorbent product is detected by paper electrophoresis (i.e. 5′-deoxythymidine-5′-phosphoric acid). For purification, if desired, the pH of the eluate is adjusted to 8.5 with ammonium hydroxide solution and the resulting mixture is chromatographer on a 3 x 20 cm. column of Dowex-2 (HCO$_3$$^-$) resin using 0.5 molar triethyl ammonium bicarbonate solution as eluant. The ultraviolet absorbing peak is obtained and subsequently evaporated to dryness and freed from residual bicarbonate by several evaporations with methanol. The resulting residue is dissolved in 10 ml. of water and added to a solution of 7 ml. of 2 N barium acetate followed by 30 ml. of ethanol to yield a precipitate of the barium salt of 5′-deoxythymidine-5′-phosphonic acid. The barium salt is collected by filtration, washed several times with ethanol and dried in vacuo.

The latter barium salt is converted to the disodium salt by passage through a column of the sodium form of a cation-exchange resin followed by lyophilization.

As an alternative to the above procedure, the 3′-O-acetyl group can be removed by treatment with methanol:ammonium hydroxide (1:1) at room temperature for 15 minutes prior to didealkylation with sodium iodide in which case the amount of thymine produced is decreased.

EXAMPLE 7

To a solution of 3.25 g. of N$^4$-acetyl-2′,3′-O-isopropylidenecytidine in 25 ml. of dimethylformamide there is added 9 g. of methyltriphenoxyphosphonium iodide and the resulting mixture is allowed to stand at room temperature for one hour. Following the reaction period, the solvent is evaporated under reduced pressure and the resulting residue is partitioned between chloroform and water. Next, the chloroform layer is washed with aqueous 5% sodium thiosulfate solution, dried and evaporated to dryness. Crystallization of the resulting residue from chloroform:hexane gave N$^4$-acetyl-5′-deoxy-5′-iodo-2′,3′-O-isopropylidene-cytidine.

A solution of 4 g. of the latter compound and 20 ml. of triethyl phosphite is heated at 150° C. for 16 hours while a stream of nitrogen saturated with triethyl phosphite is passed through the solution. The reaction mixture is evaporated to dryness under reduced pressure at 50° C. to afford a residue containing a mixture of N$^4$-acetyl-5′-deoxy - 2′,3′ - O - isopropylidenecytidine-5′-diethyl phosphonate and 5′-deoxy-2′,3′-O-isopropylidenecytidine - 5′ - diethyl phosphonate. Distillation in a short-path apparatus at 10$^{-3}$ mm. of mercury in a bath temperature of 60° C. removes all the volatile components. A mixture of 3.5 g. of the mixture of above products and 5 g. of sodium iodide in 10 ml. of dimethylformamide is heated at 150° C. for 18 hours. Following this reaction period, the mixture is concentrated to 5 ml. and added to 50 ml. of acetone to yield a precipitate of the disodium salts of N$^4$-acetyl-5′-deoxy-2′,3′ - O - isopropylidenecytidine - 5′ - phosphoric acid and 5′ - deoxy - 2′,3′ - O - isopropylidenecytidine-5′-phosphonic acid and the corresponding pyrophosphonate salts. The mixture of sodium salts is dissolved in 20 ml. of concentrated ammonium hydroxide and the resulting product is held at room temperature for 30 minutes to effect removal of the N$^4$-acetyl group. The mixture is evaporated to dryness and the residue is dissolved in water, passed through a column of free acid-form resin of sulfonated polystyrene beads cross-linked with 8% divinylbenzene to give a mixture of the free acids. The acidic eluate is heated at 100° C. for 60 minutes to yield 5′-deoxycytidine-5′-phosphonic acid. For purification if desired, the pH of the eluate is adjusted to 8.5 by the drop-wise addition of ammonium hydroxide solution and the solution is then chromatographed on a column of Dowex-2 (HCO$_3$—) bicarbonate form of a quaternary ammonium anion exchange resin eluting with 0.5 molar triethyl ammonium bicarbonate solution to give triethylammonium salt of 5′-deoxycytidine-5′-phosphonic acid which is freed from residual bicarbonate by repeated evaporation to dryness with methanol.

The latter material is converted to the disodium salt by passing it through a column of Dowex-50 (sodium$^+$) resin, a form of a cation-exchange resin, followed by lyophilization.

EXAMPLE 8

A mixture of 4.94 g. of 2,3,6-tri-O-benzoyl-5-deoxy-β-D-allofuranosyl chloride and 2.56 g. of bis-trimethylsilyluracil is heated at 180° C. for 30 minutes. The mixture is then cooled, dissolved in ethanol and the resulting solution is evaporated under reduced pressure to a syrup. The syrup is taken up in hot benzene and filtered to remove some uracil. Upon cooling the solution, the precipitate of 2′,3′,5′-tri-O-benzoyl homouridine is formed. The precipitate is dissolved in 50 ml. of methanol containing 0.54 g. of sodium methoside and the resulting mixture is allowed to stand at room temperature for an additional one hour; then the mixture is diluted with water, extracted with ether and passed through a column containing 20 ml. of a sulphonated polystyrene resin cross-linked with 8% divinylbenzene. The reaction mixture is evaporated to dryness under reduced pressure to afford a residue of [1-(5-deoxy-β-D-allofuranosyl) uracil] which is purified by recrystallization from ethanol. The concentrate is added to 100 ml. of hexane to yield a precipitate of 6′-deoxy-6′-iodo-homouridine which is recrystallized from chloroform:hexane.

EXAMPLE 9

A mixture of 2.81 g. of homoadenosine and 4.1 g. of di-(p-nitrophenyl)phosphate in a mixture of 100 ml. of acetone and 8.2 ml. of 2,2-dimethoxypropane is held at room temperature for five hours. Following this reaction period, 200 ml. of one-tenth N sodium bicarbonate solution is added to the reaction mixture and the resulting mixture is then evaporated to dryness. The residue is extracted with several portions of hot chloroform and the extracts are evaporated to dryness to yield 5'-deoxy-2',3'-O-isopropylidene allofuranosyl adenine (2',3'-O-isopropylidenehomoadenosine) which is recrystallized from aqueous ethanol. To 2.57 g. of the latter compound in 50 ml. of pyridine is added 2.9 ml. of benzoyl chloride and the resulting mixture is allowed to stand at room temperature for a period of 12 hours. Then 5 ml. of water is added to the reaction mixture and the resulting mixture is evaporated under reduced pressure to dryness. The resulting residue is partitioned between ethyl acetate and aqueous sodium bicarbonate. The ethyl acetate layer is washed with water, dried and evaporated to dryness to yield $N^6$-6'-dibenzoyl 2',3'-isopropylidene homoadenosine as a foam. The latter material is dissolved in 100 ml. of methanol containing 0.55 g. of sodium methoxide, and the resulting mixture is allowed to stand at 0° C. for a period of 15 minutes. The reaction mixture is then diluted with water and neutralized with an acid-form ion-exchange resin of sulphonated polystyrene beads cross-linked with 8% divinylbenzene. The solution is then evaporated under reduced pressure to yield a residue of $N^6$-benzoyl 2',3'-O-isopropylidene homoadenosine which is recrystallized from aqueous ethanol.

To a solution of 2.12 g. of $N^6$-benzoyl 2',3'-O-isopropylidene homoadenosine in 20 ml. of dimethylformamide there is added 4.5 g. of methyltriphenoxyphosphonium iodide and the resulting mixture is allowed to stand at room temperature for one hour. Following the reaction period the solvent is removed under reduced pressure and the resulting residue is partitioned between chloroform and water. Next, the chloroform layer is washed with aqueous 5% sodium thiosulfate solution, dried and concentrated to about 10 ml. The concentrate is then added to 100 ml. of hexane to yield a precipitate of $N^6$-benzoyl 5'-deoxy 6'-iodo-2',3'-O-isopropylidene homoadenosine [9-(5,6-dideoxy-6-iodo-2,3-O-isopropylidene-β-D-allofuranosyl)$N^6$-benzoyladenine] which is recrystallized from chloroform:hexane.

A mixture of 1.7 g. of the latter compound and 30 ml. of triethyl phosphite is heated at 150° C. for 20 hours. The reaction mixture is evaporated to dryness under reduced pressure at 50° C. to afford a residue containing 9-(5,6-dideoxy-6-(diethoxy, phosphinyl) 2,3-O-isopropylidene β-D-allofuranoxyl $N^6$-benzoyladenine[$N^6$-benzoyl-2',3'-O-isopropylidene homoadenosine 6-diethyl phosphonate].

A mixture of 2 g. of the latter material and 6 g. of sodium iodide in 20 ml. of dimethylformamide is heated at 150° C. for 18 hours. Following this reaction period, the mixture is concentrated to 5 ml. and added to 50 ml. of acetone to yield a precipitate of the disodium salts of $N^6$-benzoyl 6'-desoxy-2',3'-O-isopropylidene-homoadenosine 6'-phosphonic acid and the corresponding pyrophosphonic acid. The disodium salts are then dissolved in 20 ml. of concentrated ammonium hydroxide and the resulting mixture held at room temperature for 2 days to effect removal of the $N^6$-benzoyl group. The mixture is evaporated to dryness and the residue is dissolved in water, passed through a column of acid-form ion-exchange resin (sulfonated polystyrene beads cross-linked with 8% divinylbenzene) to give a mixture of the free phosphonic and pyrophosphonic acid. The acidic eluate is heated at 100° C. for 30 minutes and then evaporated to dryness to yield 5',6'-dideoxyhomoadenosine 6'-phosphonic acid.

The latter material is converted to the sodium salt by passing it through a column of Dowex-50 (sodium+) resin followed by lyophilization.

In a similar manner by repeating the above procedure with one exception, namely substituting first 6-chloropurine homoriboside, second 2,5-dichloropurine homoriboside, third 2-chloro homoadenosine for homoadenosine in the above procedure there are obtained the corresponding 5',6'-dideoxy homonucleoside 6'-phosphonic acids, repectively.

EXAMPLE 10

To a solution of 2.58 g. of 1-(5-deoxy-β-D-allofuranosyl) uracil in 25 ml. of dimethylformamide there is added 9 g. of methyltriphenoxyphosphonium iodide and the resulting mixture is allowed to stand at room temperature for one hour. Following this reaction period, the solvent is evaporated under reduced pressure and the resulting residue is partitioned between chloroform and water. Next, the chloroform layer is washed with aqueous 5% sodium thiosulfate solution, 2 N sodium hydroxide solution and water, dried and concentrated to a volume of about 10 ml. The concentrate is added to 100 ml. of hexane to yield a precipitate of 6'-deoxy-6'-iodo-homouridine which is recrystalized from chloroform:hexane.

The latter compound is treated according to the procedure of Example 6 to afford the corresponding 5',6'-dideoxyhomouridine 6'-phosphonic acid salt.

What is claimed is:

1. A process for the didealkylation of a dialkyl phosphonate ester which comprises heating said di(lower) alkyl phosphonate ester with at least two molar equivalents of a soluble salt selected from the group of salts of a monovalent or divalent cation consisting of a soluble bromide salt and a soluble iodide salt, in an aprotic dipolar solvent at a temperature in excess of 100° C. to furnish a mixture of the corresponding phosphonic acid salt and pyrophosphonic acid salt.

2. A process for preparing a phosphonic acid from a di(lower) alkyl phosphonate ester which comprises the process according to claim 1 wherein said mixture of phosphonic acid salt and pyrophosphonic acid salt is converted to the corresponding phosphonic acid by
   (1) treating said mixture with an acid or an acidic material to furnish a mixture of the corresponding acids; and
   (2) heating said acids at an elevated temperature.

3. The process according to claim 1 wherein said soluble iodide or bromide salt is a soluble iodide salt.

4. The process according to claim 1 wherein said soluble bromide or iodide salt is selected from the group consisting of potassium iodide, sodium iodide, lithium iodide, calcium iodide, barium iodide, ammonium iodide, tetramethylammonium iodide, tetraethylammonium iodide, tetra-n-propyl ammonium iodide, tetra n-butylammonium iodide, lithium bromide, ammonium bromide, tetra-ethylammonium bromide, and tetra n-butylammonium bromide; and said aprotic dipolar solvent is selected from the group consisting of dimethylformamide, dimethylacetamide, dimethyl sulfoxide, N-methyl pyrrolidinone, hexamethylphosphoramide, tetramethylurea, and mixtures thereof.

5. The process according to claim 4 wherein said temperature is 140° to 150° C. and said iodide salt is sodium iodide.

6. The process according to claim 1 wherein said dialkyl phosphonate ester is selected from the group consisting of a dialkyl lipid phosphonate, a dialkyl steroid phosphonate, a dialkyl sugar phosphonate, a dialkyl nucleoside phosphonate, and the homo analogs thereof.

7. The process according to claim 6 wherein said dialkyl sugar phosphonate is a dialkyl 5-deoxy pentose 5-phosphonate.

8. The process according to claim 6 wherein said dialkyl sugar phosphonate is a dialkyl 5,6-dideoxy hexose 6-phosphonate.

9. The process according to claim 6 wherein said dialkyl sugar phosphonate is a dialkyl 6-deoxy hexose 6-phosphonate.

10. The process according to claim 6 wherein said dialkyl sugar phosphonate is a dialkyl 6,7-dideoxy heptose 7-phosphonate.

11. The process according to claim 6 wherein said dialkyl nucleoside phosphonate is a dialkyl 5'-deoxynucleoside 5'-phosphonate, said nucleoside being of the pyrimidine or 6-azapyrimidine series.

12. The process according to claim 6 wherein said dialkyl nucleoside phosphonate is a dialkyl 5',6'-dideoxynucleoside 6'-phosphonate, said nucleoside being of the pyrimidine or 6-azapyrimidine series.

13. The process according to claim 6 wherein said dialkyl nucleoside phosphonate is a dialkyl 5'-deoxynucleoside 5'-phosphonate, said nucleoside being of the purine series.

14. The process according to claim 6 wherein said dialkyl nucleoside phosphonate is a dialkyl 5',6'-dideoxynucleoside 6'-phosphonate, said nucleoside being of the purine series.

15. The process according to claim 6 wherein said dialkyl steroid phosphonate is a steroid of the pregnane series having a dialkoxyphosphinylmethyl group at the C–21 position.

16. The process according to claim 6 wherein said dialkyl steroid phosphonate is a steroid of the pregnane series having a dialkoxyphosphinyl group at the C–21 position.

17. The process according to claim 6 wherein said dialkyl steroid phosphonate is a steroid of the androstane series having a dialkoxyphosphinyl group at the C–1 positions.

18. The process according to claim 6 wherein said dialkyl steroid phosphonate is a steroid of the androstane series having a dialkoxyphosphinyl moiety at the C–7 position.

19. The process according to claim 6 wherein said dialkyl steroid phosphonate is a steroid of the pregnane series having a dialkoxyphosphinyl group at the C–1 position.

20. The process according to claim 6 wherein said dialkyl steroid phosphonate is a steroid of the pregnane series having a dialkoxyphosphinyl group at the C–16 position.

21. The process according to claim 6 wherein said dialkyl steroid phosphonate is a steroid of the cholestane series having a dialkoxyphosphinyl group at the C–3 position.

22. A process for the preparation of a lipid phosphonic acid, a steroid phosphonic acid, a sugar phosphonic acid, or a nucleoside phosphonic acid which comprises:
   (1) acidifying a pyrophosphonic acid salt selected from the group of salts of a monovalent or divalent cation consisting of a lipid pyrophosphonic acid salt, a steroid pyrophosphonic acid salt, a sugar pyrophosphonic acid salt, and a nucleoside pyrophosphonic acid salt prepared according to the process of claim 1, with an acid or acidic material to furnish the corresponding pyrophosphonic acid; and
   (2) heating said pyrophosphonic acid at an elevated temperature.

References Cited

UNITED STATES PATENTS

| | | | |
|---|---|---|---|
| 3,054,821 | 9/1962 | Rolih et al. | 260—961 |
| 3,235,616 | 2/1966 | Sharman | 260—672 |

HENRY A. FRENCH, Primary Examiner

U.S. Cl. X.R.

260—234, 397.2, 397.3, 397.4, 397.45, 961